(12) United States Patent
Coddington

(10) Patent No.: US 11,757,798 B2
(45) Date of Patent: Sep. 12, 2023

(54) MANAGEMENT OF A BUFFERED SWITCH HAVING VIRTUAL CHANNELS FOR DATA TRANSMISSION WITHIN A NETWORK

(71) Applicant: ARTERIS, INC., Campbell, CA (US)

(72) Inventor: John Coddington, Cedar Park, TX (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/134,544

(22) Filed: Dec. 28, 2020

(65) Prior Publication Data

US 2022/0210096 A1 Jun. 30, 2022

(51) Int. Cl.
| | |
|---|---|
| *H04L 41/5054* | (2022.01) |
| *H04L 49/9005* | (2022.01) |
| *H04L 49/9047* | (2022.01) |
| *H04L 43/0852* | (2022.01) |
| *H04L 45/00* | (2022.01) |
| *H04L 45/44* | (2022.01) |

(52) U.S. Cl.
CPC ...... *H04L 49/9005* (2013.01); *H04L 43/0852* (2013.01); *H04L 45/20* (2013.01); *H04L 45/44* (2013.01); *H04L 49/9047* (2013.01)

(58) Field of Classification Search
CPC . H04L 49/9005; H04L 49/9047; H04L 45/20; H04L 45/44
See application file for complete search history.

(56) References Cited

U.S. PATENT DOCUMENTS

| | | | | |
|---|---|---|---|---|
| 5,432,785 A * | 7/1995 | Ahmed | ........... | H04Q 11/0478 370/231 |
| 5,528,591 A * | 6/1996 | Lauer | ........... | H04L 12/5602 370/231 |
| 5,867,499 A * | 2/1999 | Yunten | ........... | H04L 49/309 370/397 |
| 7,274,692 B1 * | 9/2007 | Hughes | ........... | H04L 47/10 370/413 |
| 7,796,629 B1 * | 9/2010 | MacAdam | ........... | H04L 49/15 370/352 |
| 7,856,026 B1 * | 12/2010 | Finan | ........... | H04L 49/3045 370/413 |
| 2003/0137939 A1 * | 7/2003 | Dunning | ........... | H04L 1/1635 370/235 |
| 2004/0019726 A1 * | 1/2004 | Kelley | ........... | G06F 13/4045 710/305 |
| 2004/0151170 A1 * | 8/2004 | Gulati | ........... | H04L 49/9089 370/360 |
| 2007/0121499 A1 * | 5/2007 | Pal | ........... | H04L 45/60 370/417 |

(Continued)

*Primary Examiner* — Abdelnabi O Musa
(74) *Attorney, Agent, or Firm* — DANA LEGAL SERVICES; Jubin Dana

(57) ABSTRACT

A buffered switch system, data loss and latency management system, and methods of use are presented. The disclosure provides, generally, a buffered switch system for end to end data congestion and traffic drop prevention. More specifically, and without limitation, the various aspects and embodiments of the invention relates to the management of buffered switch. More specifically, and without limitation, the various aspects and embodiments of the invention relates to the management of buffered switch to prevent the balancing act of buffer sizing, latency, and traffic drop.

7 Claims, 16 Drawing Sheets

(56) References Cited

U.S. PATENT DOCUMENTS

| | | | |
|---|---|---|---|
| 2009/0252171 A1* | 10/2009 | Kumar | H04L 49/101 |
| | | | 370/397 |
| 2010/0202449 A1* | 8/2010 | Moscibroda | H04L 45/40 |
| | | | 370/389 |
| 2013/0019033 A1* | 1/2013 | Shima | H04N 1/32587 |
| | | | 710/316 |
| 2017/0099236 A1* | 4/2017 | Ancajas | H04L 49/3018 |
| 2022/0067713 A1* | 3/2022 | Tietz | H04L 47/39 |

\* cited by examiner

MANAGEMENT OF A BUFFERED SWITCH HAVING VIRTUAL CHANNELS FOR DATA TRANSMISSION WITHIN A NETWORK

FIELD OF THE INVENTION

The invention relates generally to computer system design and, more specifically, to buffered switch for prevention of end to end data congestion and traffic drop in a network.

BACKGROUND

The various aspects and embodiments of the invention relates generally to buffer switches. When a network switch interface (or more simply and generally, a data center for handling data) receives more traffic than it can process at a given time, the network either buffers or drops the traffic. Traffic loss is generally undesirable so buffering switching has become very important in the state of the art. Buffered switch, or buffering, as the result of traffic overload is generally caused when interface speed differences or sudden traffic bursts and/or when a large number of traffic are directed to a single target. These types of traffic patterns can result in an overload of traffic, which in turn causes the need for buffering.

Modern data center switching platforms handle buffering through shared switch buffers. In this way, the buffer switch is sized itself to store data. Simply put, the buffer acts as an overflow, which stores data, and then reorganizes the data for sending at appropriate times. In this way, data is not dropped but can still be transmitted. However, this data suffers from latency, and depending on the size of the buffer and traffic flow through the network, can be a large latency. Said another way, in modern data center switching platforms, the buffer switch has a pool of buffer space to allocate to specific ports during times of congestion. For this reason, depending on the application and management, the amount of buffer space varies greatly among various vendors, platforms, managers, and the like.

Optimizing network buffering is critical to the success of data transfer and/or network switching for ease and success of data transmission. Oversized buffers provide that less traffic, or no traffic depending on the complexity, will ever be dropped. However, larger or oversized buffers cause latency in data transmission. In modern data centers, the larger the buffering network, the increased latency. This is caused because the traffic moving through the buffer is being stored as traffic on the buffer prior to being forwarded. For this reason, data center managers, or network administrators, often prefer to have smaller buffers so that latency does not become an issue However, this often means lost traffic. This creates a constant balancing act for those designing the systems, managing the systems, sending traffic through the systems, and the like.

As a result of buffer switch systems failing to provide guarantees of delivery and struggling with latency, there is a need for a buffer switch system and method of use that provides for end to end data transmission without packet loss, latency, and/or jitter. Thus, there is a need for a system and method that guarantees delivery while still providing prioritization for efficiency, and ample amount of buffer availability (or proper application of ports and egress) to prevent data loss (or data dropping).

Furthermore, modern systems often require the implementation of credits from the inputs to the outputs such that inputs never try to send packets to outputs, if the output cannot receive them. Buffers, or more specifically, virtual channel buffers are fairly complicated, requiring internal switching to arbitrate amongst different virtual channels, with which various packet types associate.

SUMMARY

The various aspects and embodiments of the invention relates generally to buffered switch for end to end data congestion and traffic drop prevention. More specifically, and without limitation, the various aspects and embodiments of the invention relates to the management of buffered switch. More specifically, and without limitation, the various aspects and embodiments of the invention relates to the management of buffered switch to prevent the balancing act of buffer sizing, latency, and traffic drop.

In accordance with some aspects and embodiments of the invention, virtual channel (VC) buffered switches use credits between buffered switches. In accordance with some aspects and embodiments of the invention, a virtual channel buffered switch does not need credits within the buffered switch itself, from ingress to egress. In other words, credits and resulting issues caused in modern buffering systems, within the switch, are eliminated as explained and disclosed herein. More specifically, various aspects and embodiments of the invention provide internally separated paths from input to output, which are based per VC. Due to the design and implementation of the disclosure herein, no internal path can be blocked by other virtual channels. This enables bandwidth to be fully utilized within each switch.

More specifically, the various aspects and embodiments of the invention provides for a new buffering switching system, which is dramatically smaller, requires fewer wires, is more efficient, less buggy, has less data drop, and many other advantages on the state of the art through a newly developed internal separation of pathways. Said another way, the various aspects and embodiments of the invention provides a new type of connection and/or separation of paths between the input and the output. More specifically, but without limitation, one example of a very effective development (as disclosed herein) is the separation of these pathways per each virtual channel. This has dramatically improved upon the state of the art because the various aspects and embodiments of the invention provides a system (for the first time) in which no internal path can be blocked by other virtual channels (which occurs commonly and in every existing system). For this reason, the various aspects and embodiments of the invention (for the first time) provides the state of the art with a virtual channel buffering switch which can fully utilize a bandwidth within the switch.

Additionally, and as another advantage of the various aspects and embodiments of the invention, the design of the various aspects and embodiments of the invention provides for size savings. More specifically, creating a design which achieves the goals herein, would cause modern virtual buffer credit circuitry to have multiple levels of switching, which would add to the complexity of the credit logic. In this way, the modern system would be far worse when making the proposed changes as described herein. For this reason, the modern system does not advance as the unloading logic would have far worse timing paths, increased number of bugs and deadlock scenarios, and be much more susceptible in general; and perhaps most importantly, this would greatly increase the physical size of the modern system.

However, while the design of the various aspects and embodiments of the invention may seem to press for the creation of larger physical design and increased wiring, the system provided in this disclosure actually is smaller with fewer wires than modern systems. One of the reasons the various aspects and embodiments of the invention is able to provide these unforeseen advantages is because the various aspects and embodiments of the invention provides the same number, or more, virtual channels between switches (or within virtual channel switches) while actually completing this goal with fewer switches. In this way, and for this reason, the various aspects and embodiments of the invention requires fewer wires, less complexity, reduces bugs, deadlocks, and other problems with modern systems. For this reason, the various aspects and embodiments of the invention is faster, smaller, and has fewer wires than existing systems, and this is even before the addition and/or utilization of credit circuitry.

Furthermore, the various aspects and embodiments of the invention also provides variations which are suitable and dramatically improve various implementations. As one example, a variation of the disclosure includes virtual channel hopping (or virtual channel mapping) in which a layer has been added to the system which is useful for efficiency (and other reasons) in looped topologies. Similarly, this variation of virtual channel hopping (or virtual channel mapping), in which a layer has been added to the system is useful for efficiency (and other reasons) in traffic management.

Furthermore, the various aspects and embodiments of the invention also provides systems and implementations of the system for potential sites for options buffering, which increases the speed of the disclosure herein. This improvement and/or variation on the disclosure presented herein can enhance speeds of the performance in particular applications.

Furthermore, the various aspects and embodiments of the invention also provides systems and implementations of the system for additional buffering handling within virtual channel switches, as shown herein. This methodology and/or implementation of the system disclosed herein has been shown to dramatically increase the throughput of a mesh topology.

Systems that embody the disclosure, in accordance with the aspects thereof, are typically designed by describing their functions in hardware description languages. Therefore, the various aspects and embodiments of the invention is also embodied in such hardware descriptions, and methods of describing systems as such hardware descriptions, but the scope of the various aspects and embodiments of the invention is not limited thereby.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and the presently understood best mode of the invention are described with additional detail through use of the accompanying drawings.

DETAILED DESCRIPTION

Figure 1:
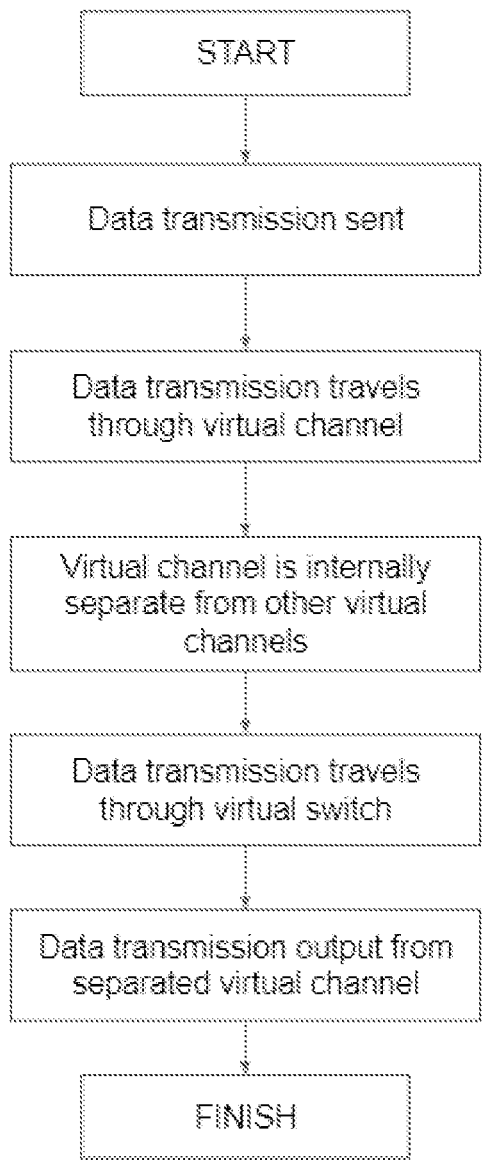
FIG. 1 illustrates data transmission and management through a network in accordance with an embodiment and various aspects of the invention.
Figure 2:
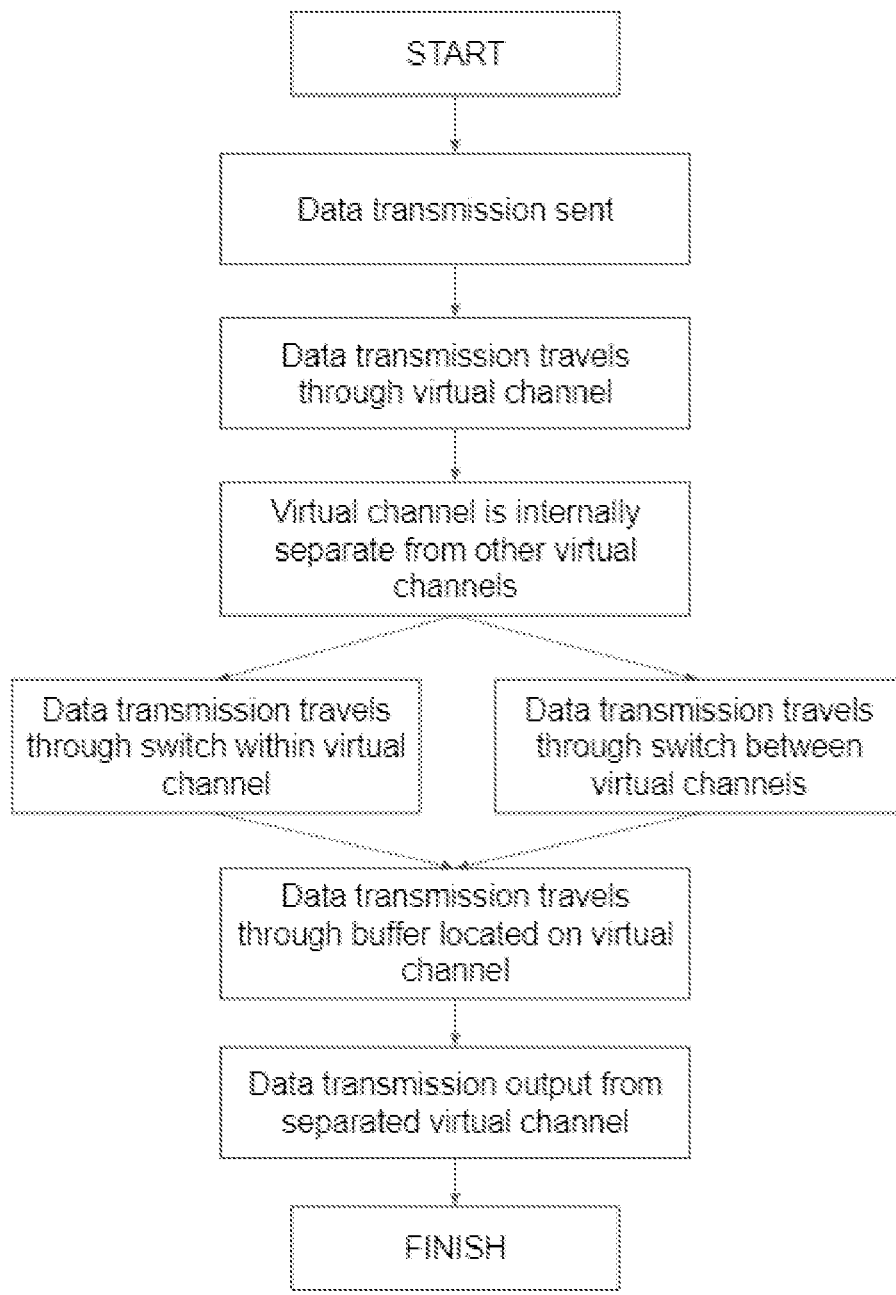
FIG. 2 illustrates data transmission and management through a network in accordance with an embodiment and various aspects of the invention.
Figure 3:
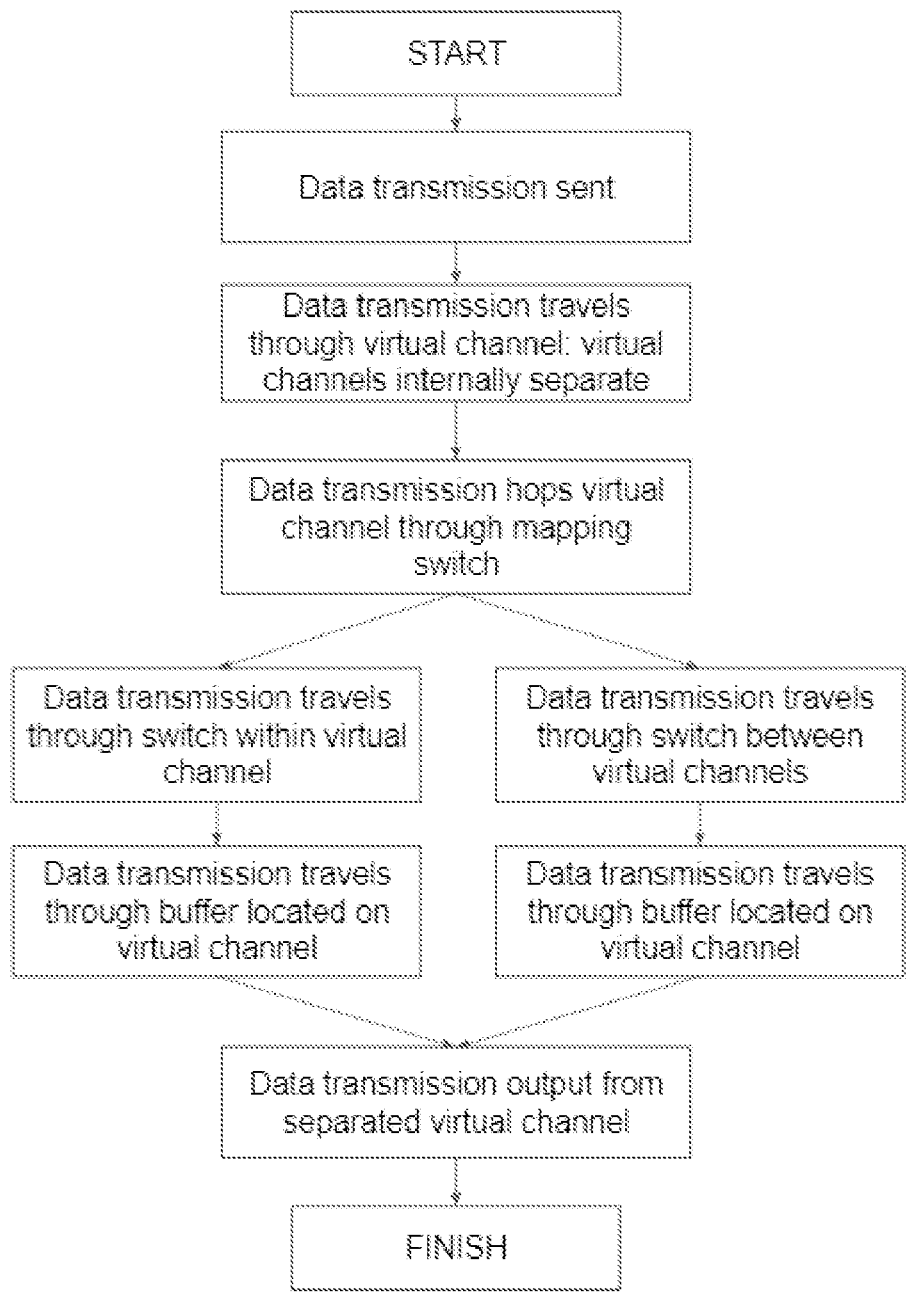
FIG. 3 illustrates data transmission and management through a network in accordance with an embodiment and various aspects of the invention.
Figure 4:
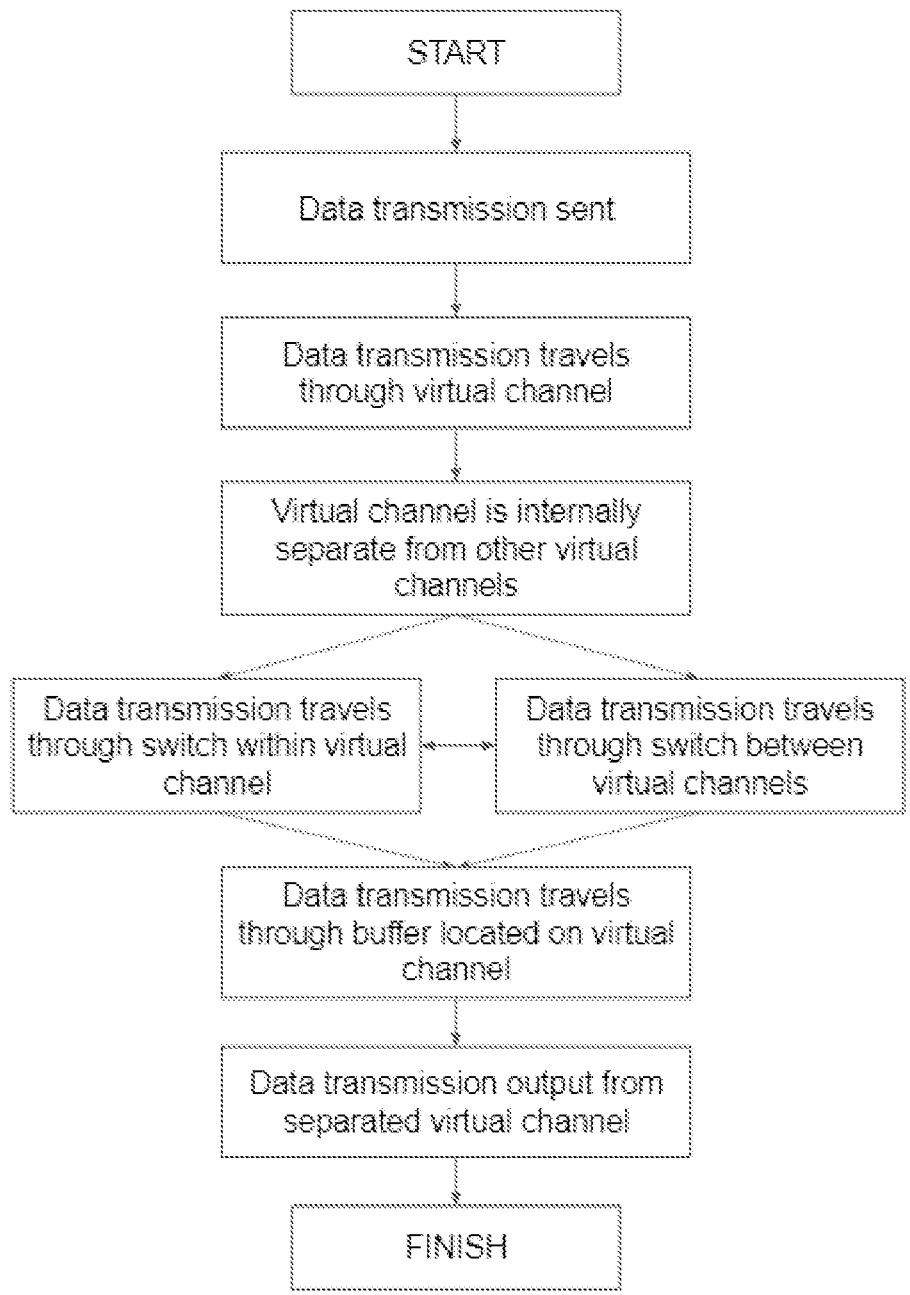
FIG. 4 illustrates data transmission and management through a network in accordance with an embodiment and various aspects of the invention.
Figure 5:
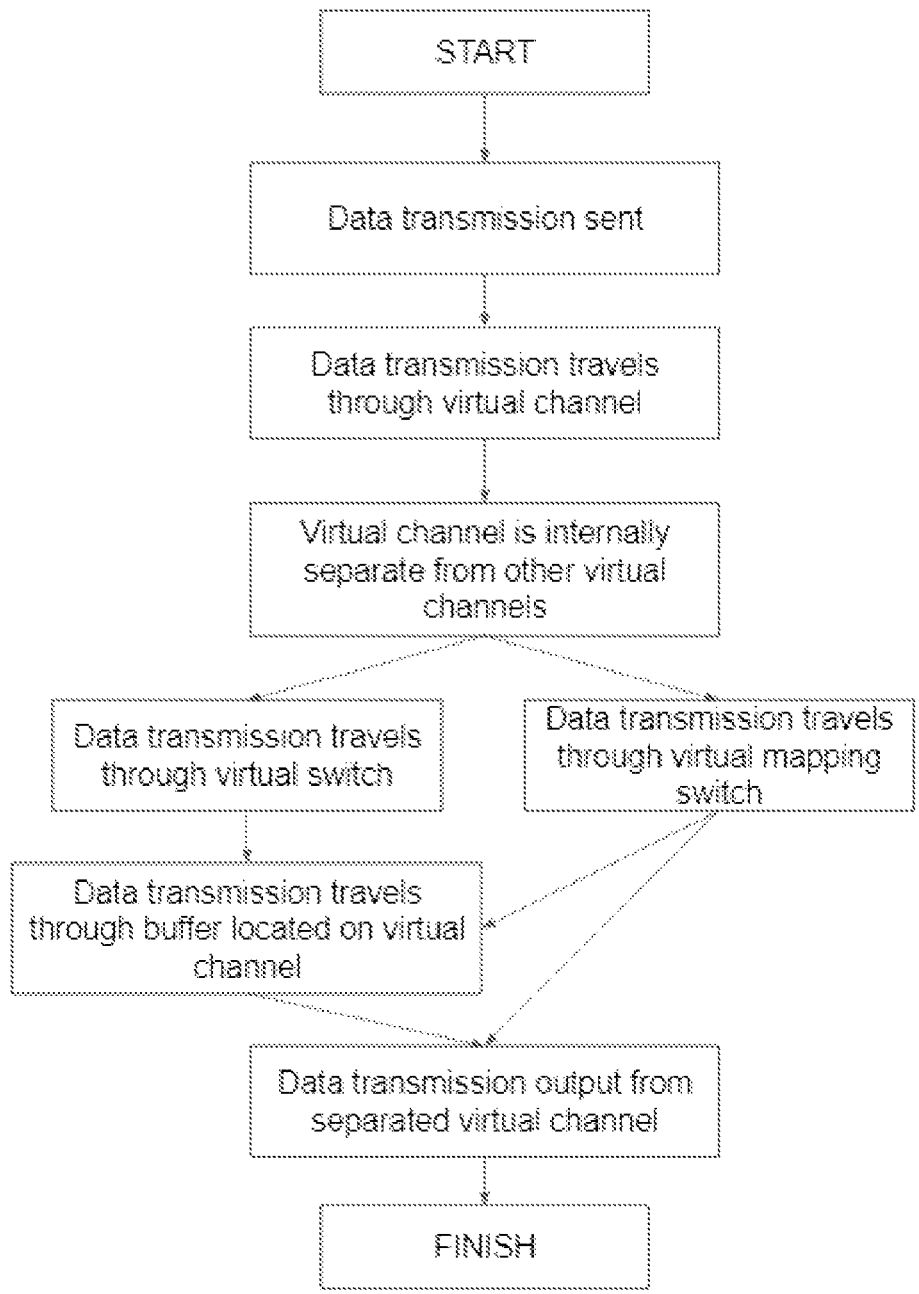
FIG. 5 illustrates data transmission and management through a network in accordance with an embodiment and various aspects of the invention.
Figure 6:
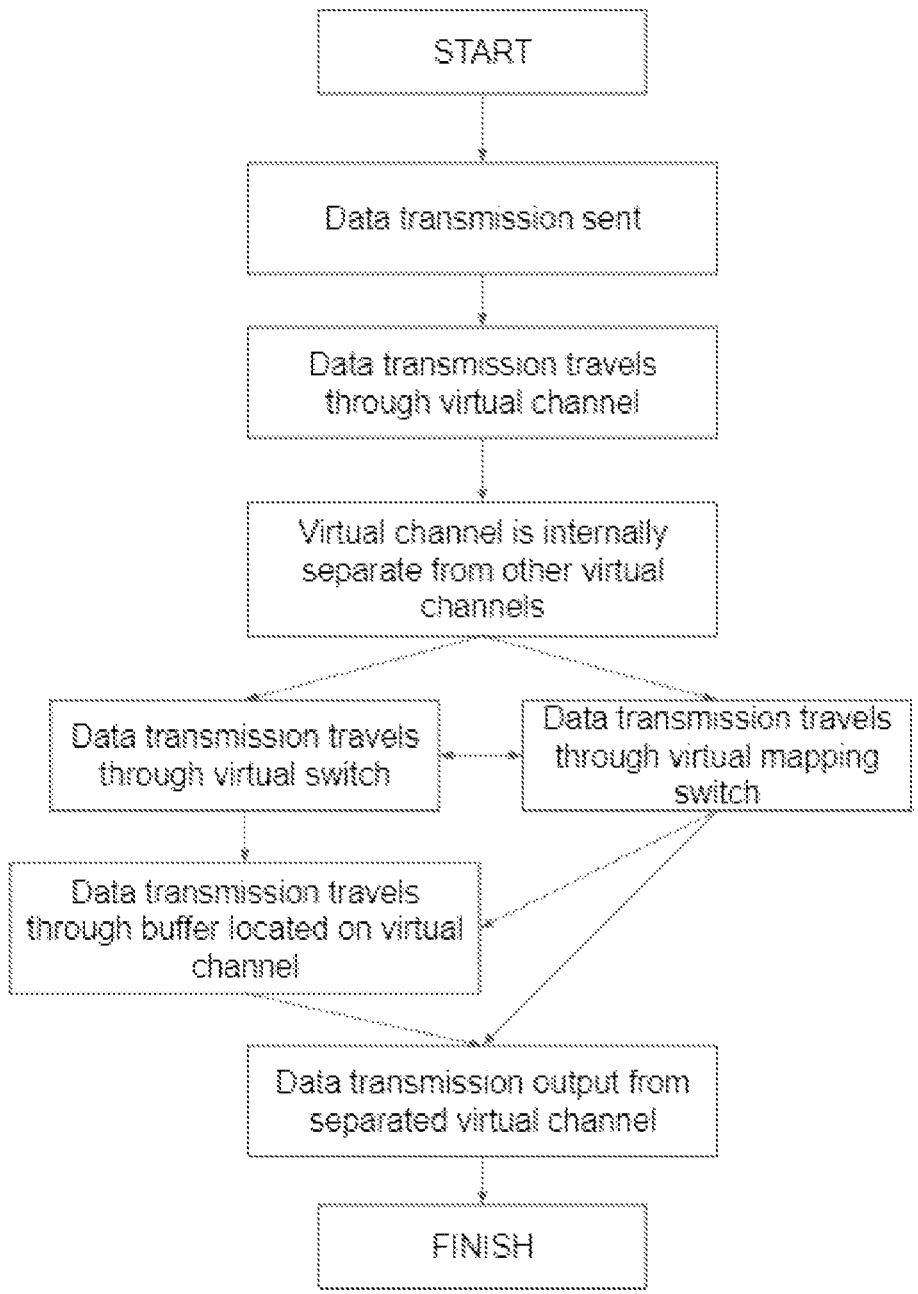
FIG. 6 illustrates data transmission and management through a network in accordance with an embodiment and various aspects of the invention.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Embodiments in accordance with the various aspects of the invention may be embodied as an apparatus, method, or computer program product. Accordingly, the various aspects and embodiments of the invention may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the various aspects of the invention may take the form of a computer program product embodied in any tangible medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the various aspects and embodiments of the invention may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the various aspects of the invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

All illustrations of the drawings are for the purpose of describing selected versions of the various aspects and embodiments of the invention and are not intended to limit the scope of the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

In accordance with the various aspects and embodiments of the invention, the following descriptions are in reference to FIG. 1 through FIG. 16. The various aspects and embodiments of the invention relates to the management of the transmission of data. More specifically, and without limitation, the various aspects and embodiments of the invention provides efficient buffered switch for end to end data congestion and traffic drop prevention. The various aspects and embodiments of the invention provides more efficient buffered switch for the state of the art because the various aspects and embodiments of the invention has a higher bandwidth usage, less (if any) data drop, less latency, fewer wires required for assembly, smaller chip size, and more.

Said another way, and without limitation, the various aspects and embodiments of the invention relates to the management of buffered switches. More specifically, and without limitation, the various aspects and embodiments of the invention relates to the management of buffer switching to prevent the balancing act of buffer sizing, latency, and traffic drop. The current state of the art requires a balancing act between latency and data drop. The various aspects and embodiments of the invention provides solutions to these long felt needs in the art, and more, while solving many problems in an unexpected manner, through extensive research and time investment.

Although the disclosure may be explained in relation to examples of embodiments, it is to be understood that many other possible modifications and variations can be made without departing from the spirit and scope of the invention.

In accordance with the aspects and embodiments of the invention, the buffered switch system can start sending data before the entire packet is received. As such, the buffer does not need to be the size of a packet. One advantage is an improvement in performance. In accordance with some aspects and embodiments of the invention, the buffering in the buffered switch are configurable. Stated a different way, the buffer depths are configurable and can be configured to hold an entire packet.

In accordance with the aspects and embodiments of the invention, buffered switches allow a virtual channel (VC) on an incoming port to hop past another VC from the same port and, thus, preventing head of line blocking between VCs. This ensures timing closure by meeting the timing requirements and avoiding delays.

With reference to the figures, a buffered switch system, data loss and latency management system, and methods of use 10 are presented (hereafter known as "buffered switch," "buffer switching system," "data loss and latency management system," "data loss management system," or "latency management system" or simply "system"). Buffered switch system 10 is formed of any suitable size, shape, and design. In the arrangement shown, as one example, system 10, may data centers, data packets, comprise remote servers, databases, application servers, application databases, application programming interfaces, user databases, event databases, transmission rule databases, rules databases, data transmission components and/or features, mobile applications, and/or computers, and the like, that fulfill the functions disclosed herein.

In the arrangement shown, as one example, a buffered switch system 10 is provided for the transmission of data. During typical data transmission, data and/or data packets are sent through a wire. This wire (to be further discussed herein) is configured to carry a certain amount of data and/or data packets. At varying times, different amounts of data and/or data packets are transmitted. Furthermore, varying times may see spikes to a particular address or from a particular point. Furthermore, other variances and/or variables can contribute to data transmission. Typically, a wire or the like will have what is referred to as a bandwidth. This is the amount of data or data packets that can be transmitted at a given time across a single source.

In this type of system, if the data being transmitted exceeds the bandwidth at a given time, then the data is lost. These data or data packets are lost, or more commonly referred to as "dropped". To prevent this type of data loss in a system, a buffering system is added. Common buffering systems are a type of holding place so that data goes to buffering and is potentially delayed rather than lost. The more and more complex and the more and more data systems become, larger data transactions and the like, the more latency that will occur with the added complexity of buffering systems. Engineers, managers, and the like constantly struggle with the balancing act of data loss and latency due to these types of systems. The various aspects and embodiments of the invention provides a system which does not have latency and prevent data loss through the novel creation of an internally separated channel for data travel.

In accordance with some aspects and embodiments of the invention, the system does not require credits with the buffered switch itself. Stated another way, the use of credits are eliminated within the buffered switch itself, which is from ingress to egress. In accordance with some aspects and embodiments of the invention, credits are used between buffered switches. In accordance with some aspects and embodiment of the invention, an egress port on a buffered switch will not send a packet, on a VC, to an input (ingress port) of another buffered switch, if that input has no space available in its VC, such as the buffer for virtual channel 20, for that VC. In order to determine if the input (ingress port) of a buffered switch has space, which is when sending packets between buffered switches, the system uses a ready signal for each VC. In accordance with some aspects and embodiments of the invention, the system determines, when sending packets between buffered switches, if the receiving buffered switch's input (the VC) has space to receive an input through the use of credits. The various aspects and embodiments of the invention actually provides for a smaller system with fewer wires, as compared to the more cumbersome existing systems.

In accordance with various aspects and embodiments of the invention, arriving transactions to the system are sorted onto any one of a plurality of virtual channels (to be further discussed herein). The data and/or data packet then travels along a dedicated, internally separate virtual channel. This data and/or data packets may travel through various virtual switches and eventually emerge as output. In this way, and as is shown in one example, the end switch will know if a particular virtual channel is being used because the circuit and/or dedicated channel is internally separate. In other words, the end switch will know what is happening at the input of any given channel.

Additionally, while the arrangement, or example discussed above contemplates a singular, internally separate virtual channel for ease of example and explanation, multiple virtual channel assemblies with a plurality of mapping switches, within virtual channel switches, between virtual channel switches, various buffer locations, and various egress means are hereby contemplated for use.

In this way, and in the arrangements shown herein, the latency and data loss management system 10 includes, in addition to other features mentioned herein, a wire 12, an input 14, an output (egress) 16, a virtual channel 20, a virtual channel switch 30, and a buffer 40, among other components, features, and functionalities.

In the arrangement shown, as one example, system 10 may include a wire 12, which represents a link or a path. Wire 12 is formed of any suitable size, shape, and design and is configured to carry data and/or data packets. Generally speaking, a wire may be formed of various sizes such that are used for delivering different data types and the like to the buffering system. In this way, a wire 12 or wires 12 are what connect the buffer system 10 to the exterior environment and/or the sources of data delivery and/or data egress. Routing wires come in many different formats and/or configurations.

Figure 7:
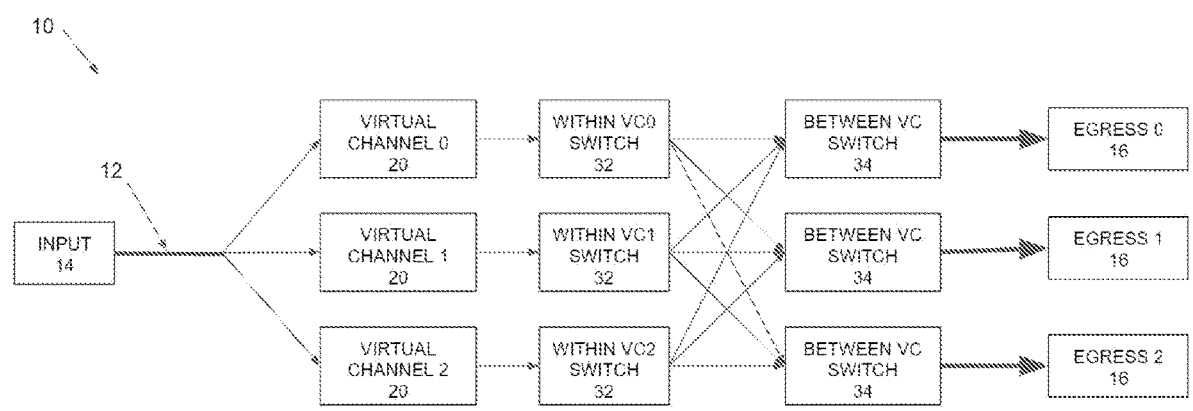
FIG. 7 illustrates a block diagram for an embodiment of a system in accordance with the various aspects of the invention.
Figure 8:
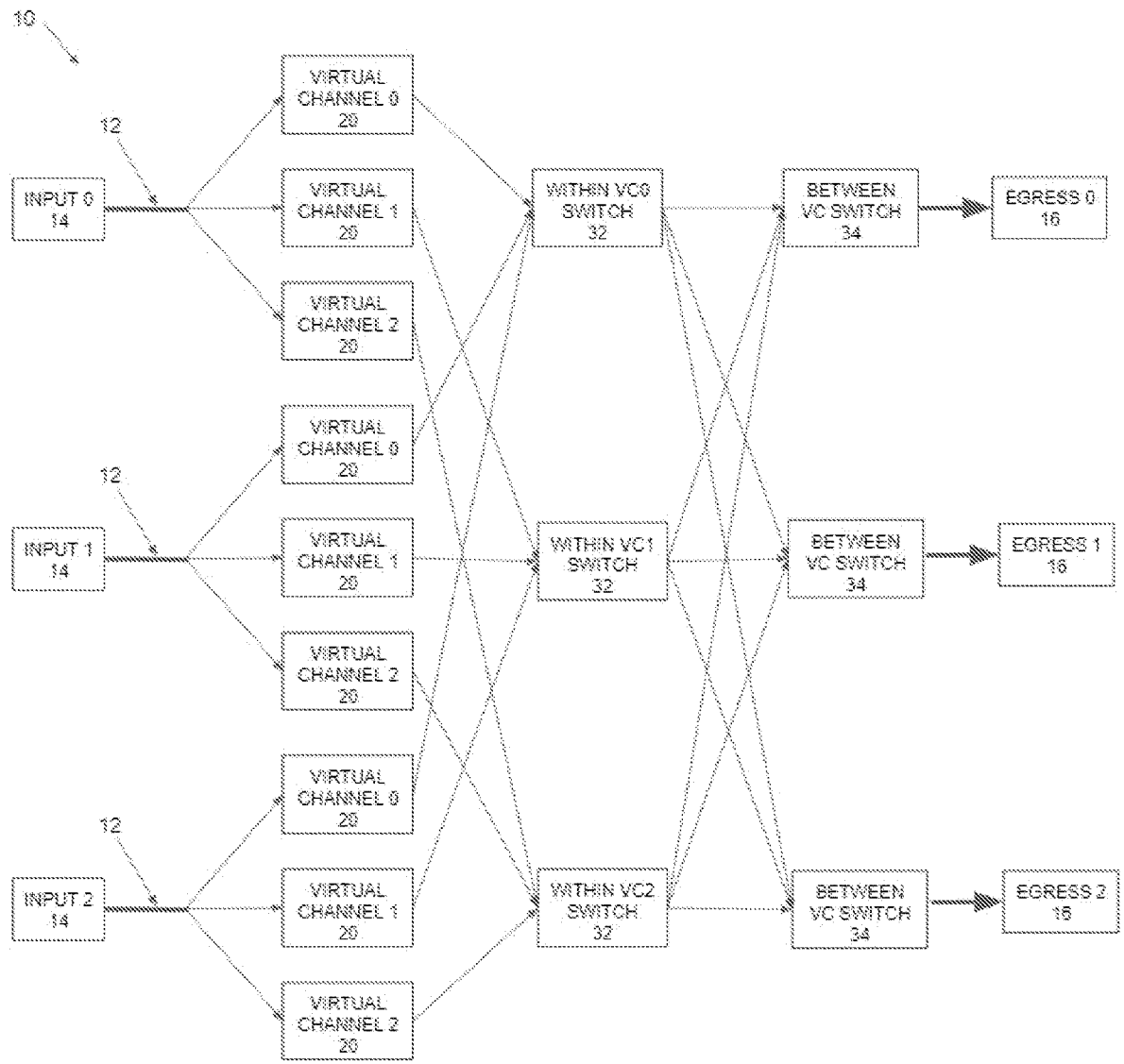
FIG. 8 illustrates a block diagram for an embodiment of a system in accordance with the various aspects of the invention.
Figure 9:
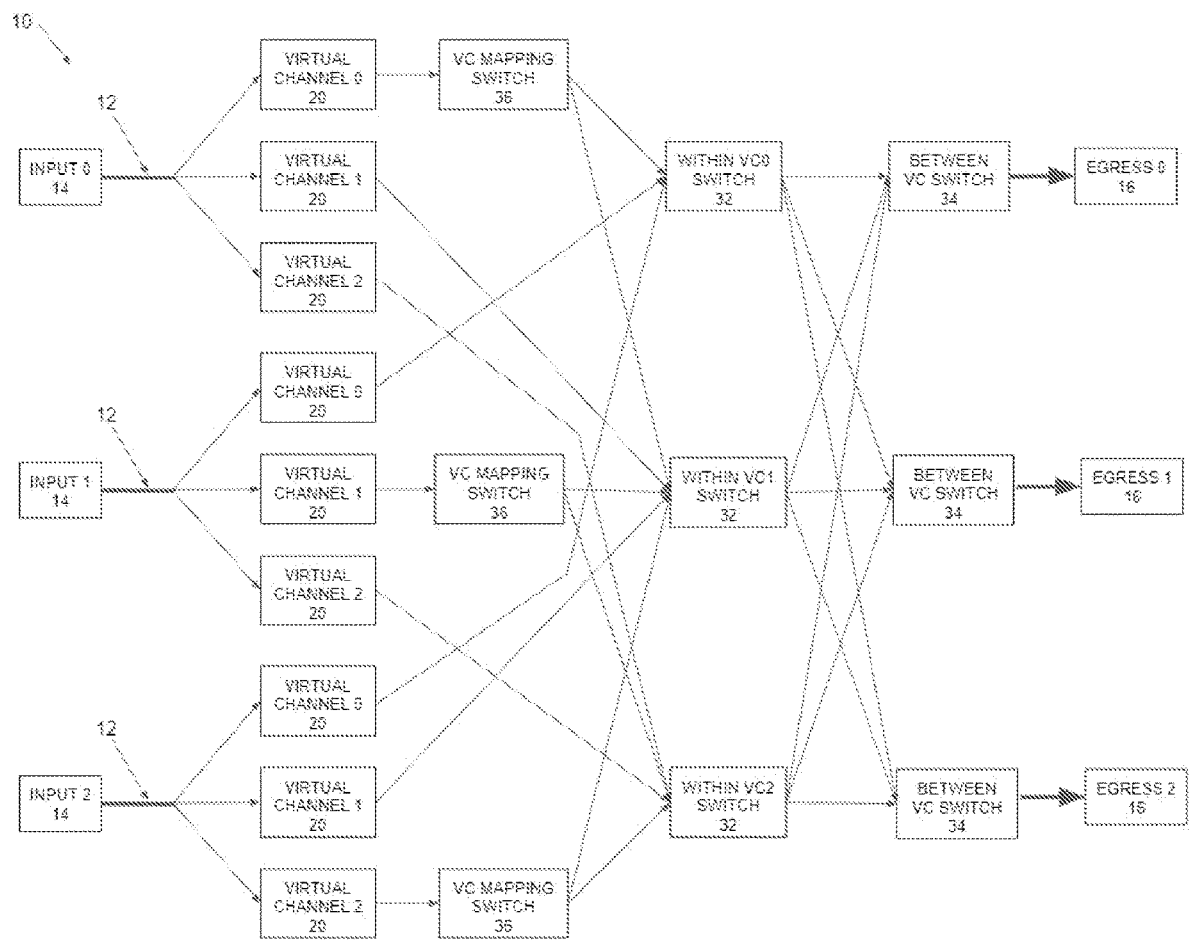
FIG. 9 illustrates a block diagram for an embodiment of a system in accordance with the various aspects of the invention.
Figure 10:
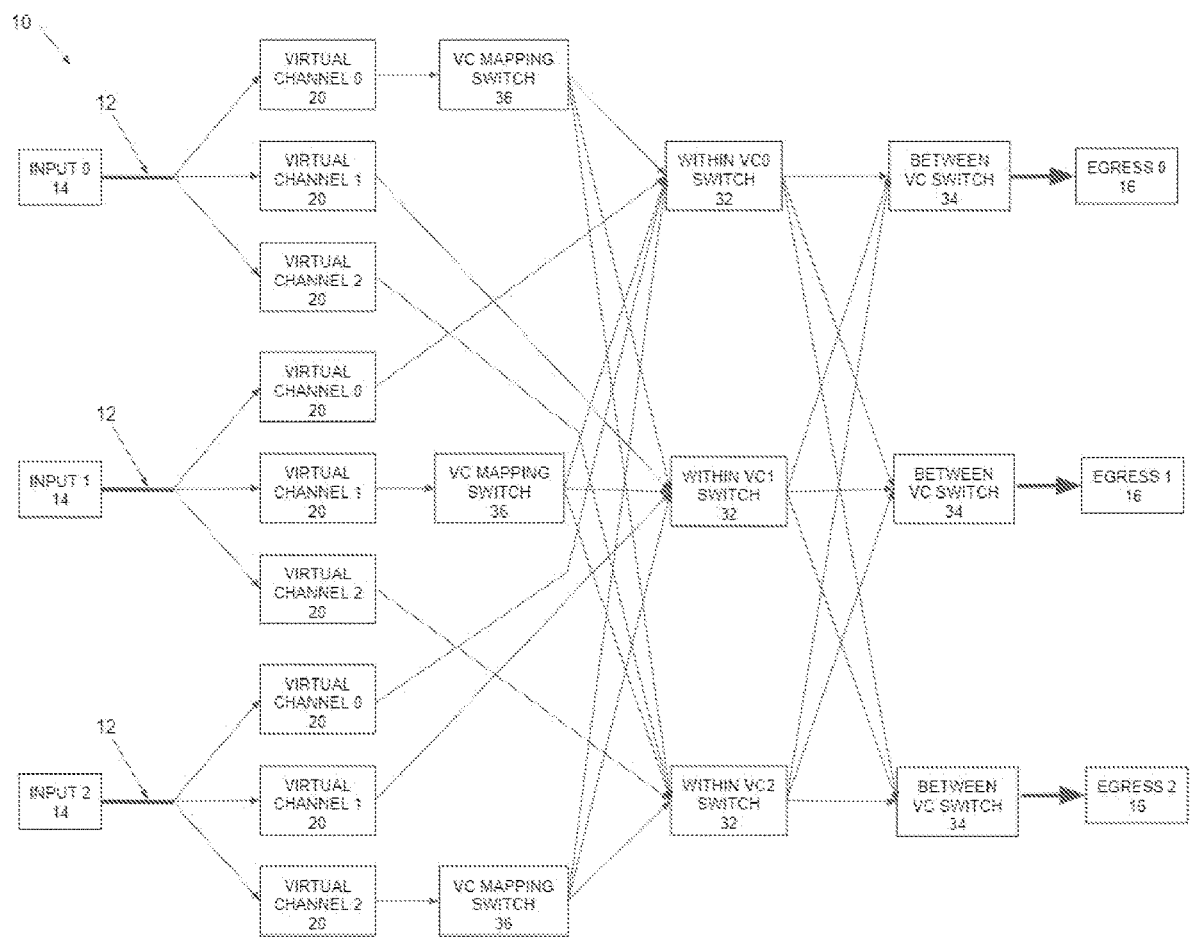
FIG. 10 illustrates a block diagram for an embodiment of a system in accordance with the various aspects of the invention.
Figure 11:
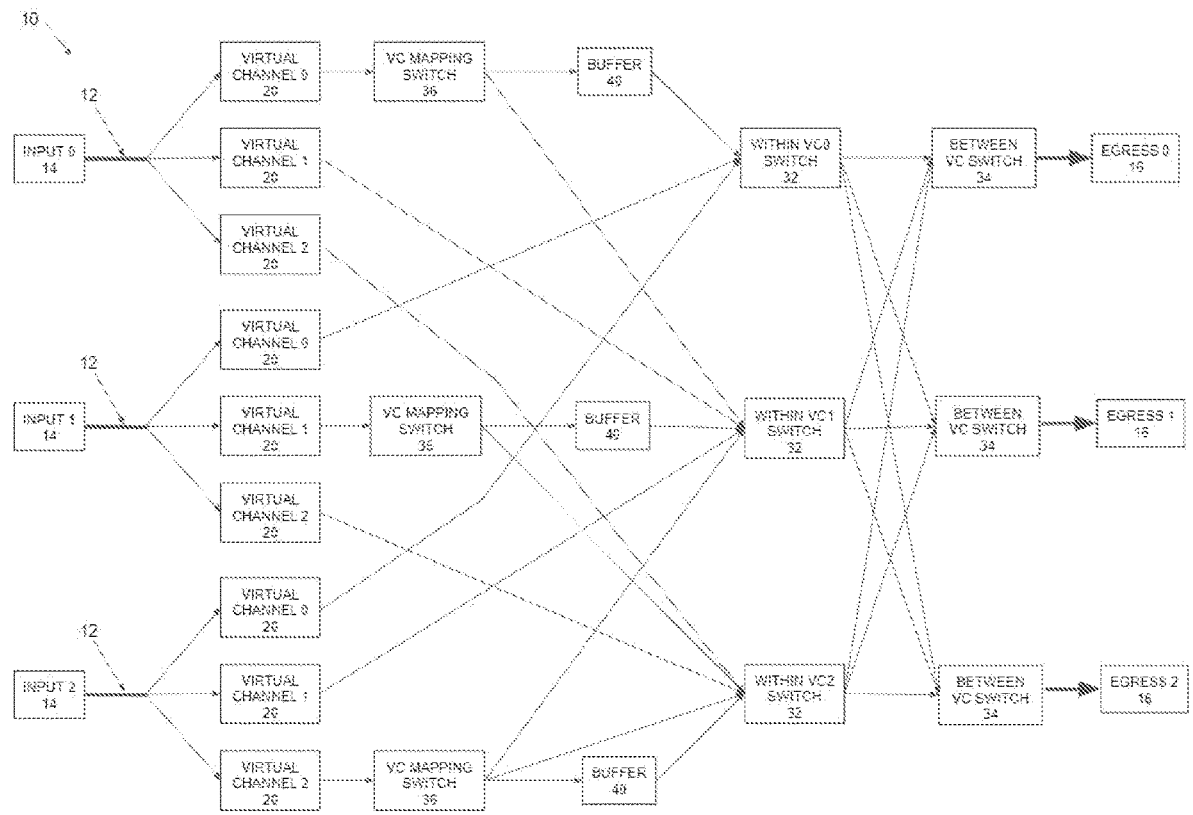
FIG. 11 illustrates a block diagram for an embodiment of a system in accordance with the various aspects of the invention.
Figure 12:
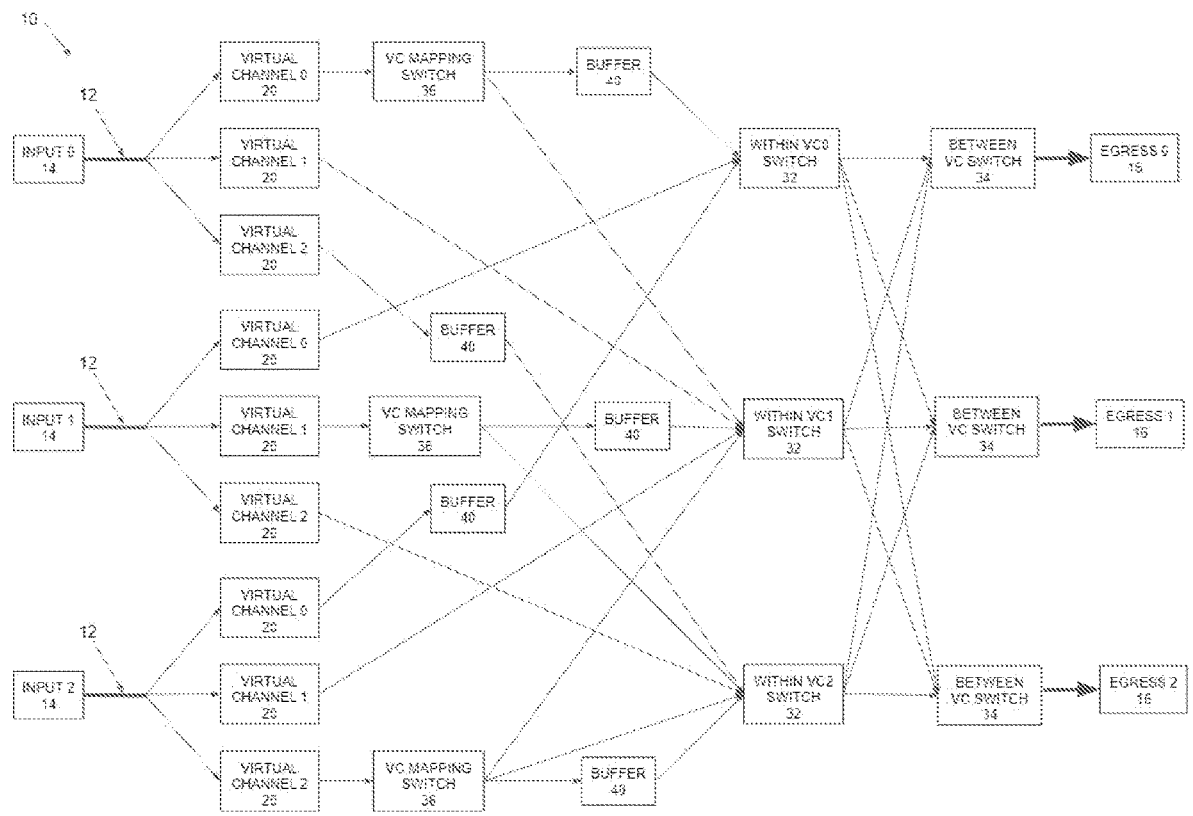
FIG. 12 illustrates a block diagram for an embodiment of a system in accordance with the various aspects of the invention.
Figure 13:
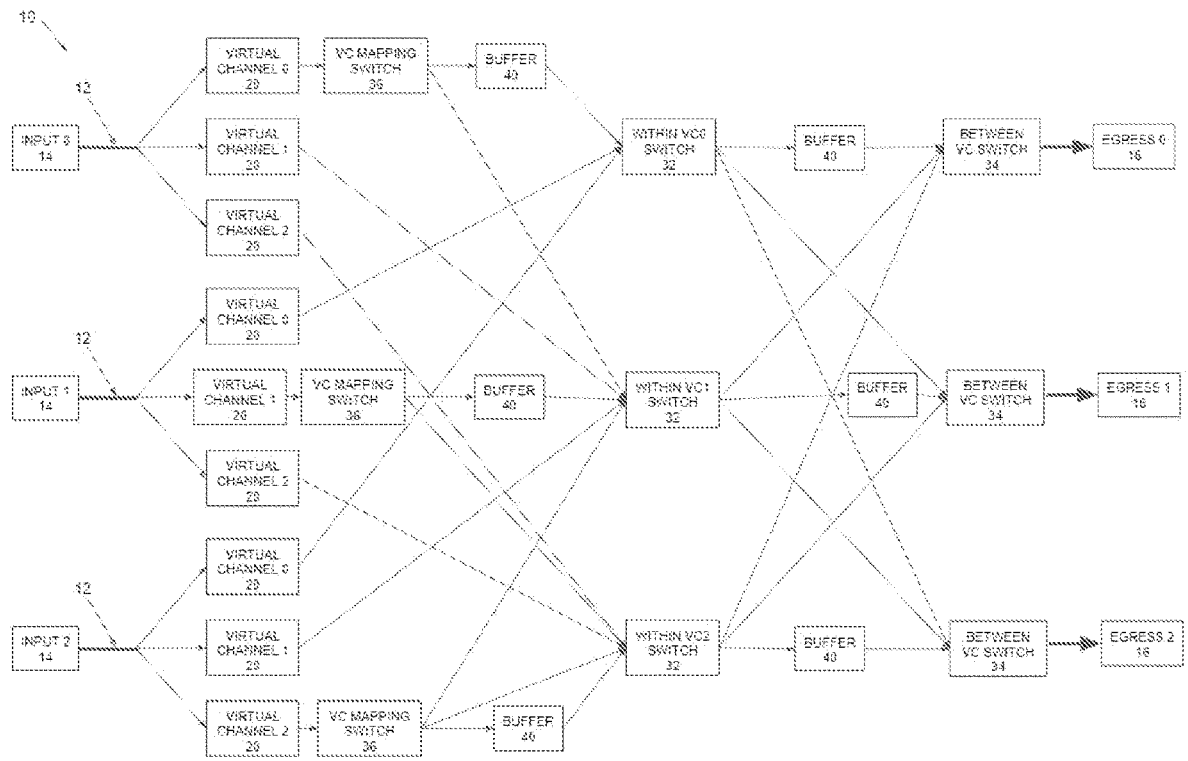
FIG. 13 illustrates a block diagram for an embodiment of a system in accordance with the various aspects of the invention.
Figure 14:
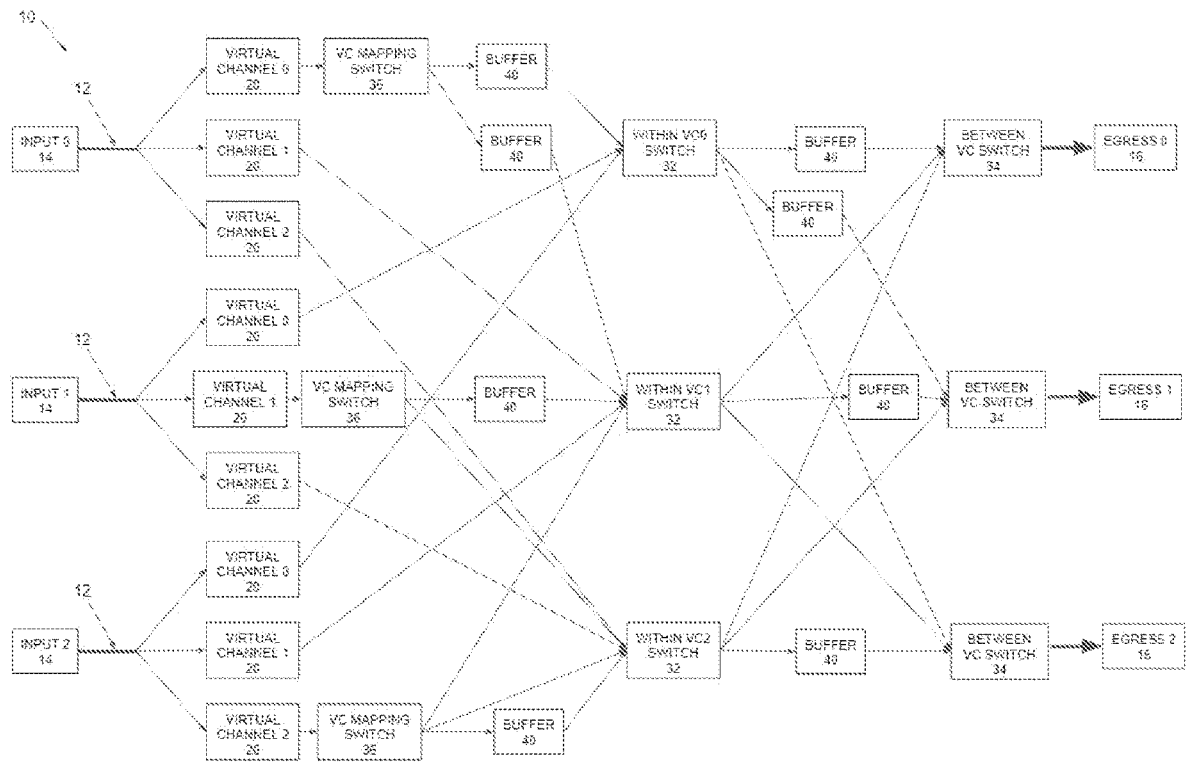
FIG. 14 illustrates a block diagram for an embodiment of a system in accordance with the various aspects of the invention.
Figure 15:
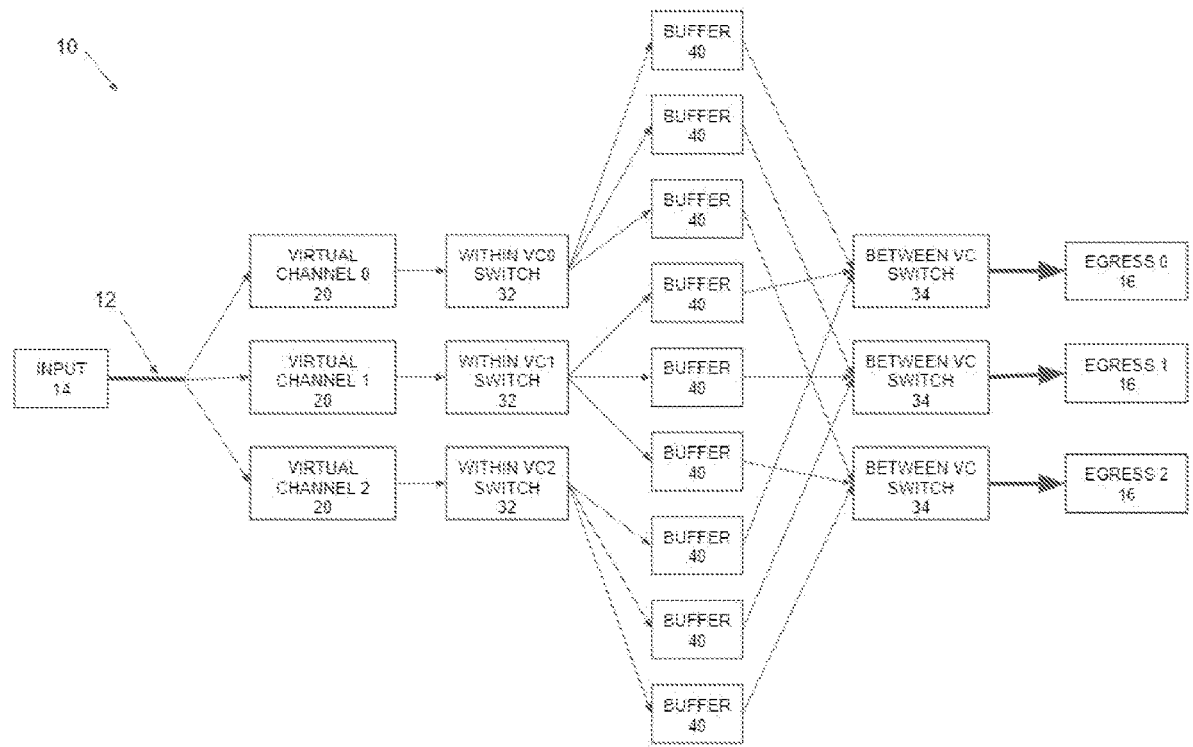
FIG. 15 illustrates a block diagram for an embodiment of a system in accordance with the various aspects of the invention.
Figure 16:
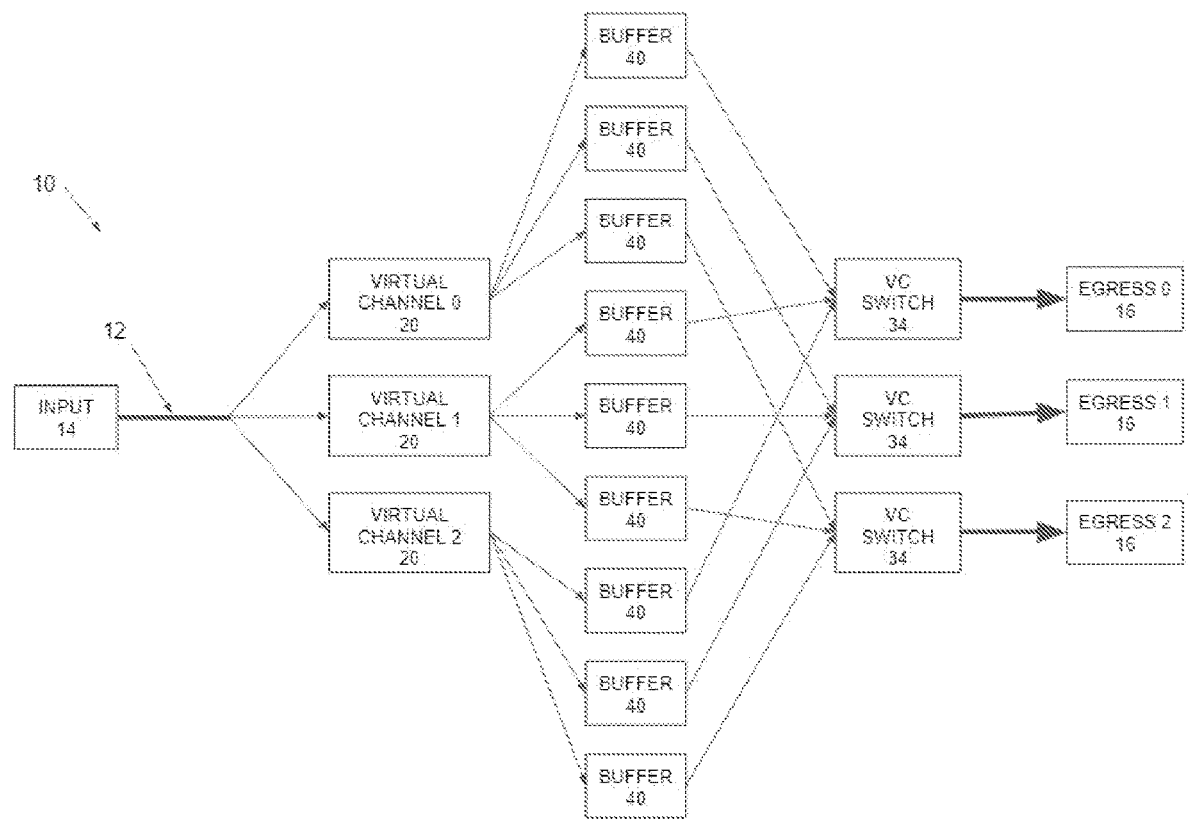
FIG. 16 illustrates a block diagram for an embodiment of a system in accordance with the various aspects of the invention.

In the arrangement shown, as one example, a wire 12, such as in FIG. 7, as delivering three different virtual channels, to be further discussed herein. While three different virtual channels are shown, the input 14 (FIG. 7) comes into the system 10 via a wire 12, any other number of virtual channels may emerge from a wire. For example, the wire 12 may carry a single virtual channel, two virtual channels, four virtual channels, five virtual channels, six virtual channels, seven virtual channels, eight virtual channels, nine virtual channels, or any other number of virtual channels. Likewise, a wire may be made of various materials and have various sizes.

In the arrangement shown, as one example, system 10 includes input 14. Input 14 (also known as an "arriving transaction," a "packet," "data," or "data packets") is formed of any suitable size, shape, and design and is typically configured as a data packet which is being sent from end to end. Arriving transactions in the arrangement shown, as one example, for system 10 includes a plurality of arriving transactions 14 (hereafter known as "departing transactions," a "packet," "data," "data packets," "egress data," "throughput," or simply "transactions"). Arriving transactions 14 is formed of any suitable size, shape, and design, and is a term used to describe incoming traffic. In the arrangement shown, as one example, arriving traffic may come from various addresses, sources, with varying priorities. Additionally, and in the arrangement shown, arriving transactions may carry a quality of service field, priority levels, and various other identifiers which can be used to determine the requirements and/or goals of the arriving input.

In the arrangement shown, as one example, system 10 includes output 16. Output 16 (also known as a "departing transaction," "data," or "data packets") is formed of any suitable size, shape, and design and is typically configured as a data packet which is being sent from end to end. Departing transactions in the arrangement shown, as one example, for system 10 includes a plurality of departing transactions 16 (hereafter known as "arriving transactions," "data," "data packets," "departing traffic," or simply "transactions"). Departing transactions 16 are formed of any suitable size, shape, and design, and is a term used to describe outgoing traffic and/or used to describe traffic as it is departing system 10, as outlined herein. In the arrangement shown, as one example, departing traffic may depart to various addresses, sources, with varying priorities. Additionally, and in the arrangement shown, departing transactions may carry a quality of service field, priority levels, and various other identifiers which can be used to determine the requirements and/or goals of the departing output.

Virtual channels in the arrangement shown, as one example, for system 10 includes a virtual channel 20. Virtual channel 20 (or "channel," or "plurality of virtual channels," or "at least one virtual channel," or "path," or simply "channel") is formed of any suitable size, shape, and design and is configured to transmit and/or carry data and/or data packets end to end in a system. In accordance with some aspects and embodiments of the invention, virtual channel 20 that is connected to the input 14 via wire 12 and includes a buffer at each virtual channel 20. In this way, a virtual channel 20 is known as the path that data and/or a data packet may travel along in a buffered switch system 10.

In some of the arrangements shown, a channel or virtual channel 20 is associated with several small queues, virtual channels, or rather a stream or path. Virtual channels 20, in the arrangement shown, are channels which hold data being transacted on various bandwidths. Said another way, and in the arrangements shown, a virtual channel 20 or virtual channels 20 are configured to decouple, buffer resources during the end to end transmission process. This decoupling allows active data and/or data packets to pass other data through the network and/or system on bandwidth that would otherwise be left idle.

Dedicated virtual channel in the arrangement shown, as one example, for system 10 includes dedicated virtual channels. Said another way, the dedicated and/or internally separate virtual channel does not blindly send packets downstream and/or will not need the implementation of a credit system because the dedicated virtual channel will only accept input on the input of the dedicated virtual channel if the output port is clear. If the output port of a dedicated virtual channel is busy processing packets from other ports or the virtual channel for the output is blocked, the virtual channel input will go to a different virtual channel that is not busy or that has an available output port, or another virtual channel.

In accordance with the aspects and embodiments of the invention, the system 10 includes a virtual channel buffer. In this way, the virtual channel buffers include an internal switching to arbitrate amongst the different dedicated virtual channels, with which the data and/or data packets are associated. Said another way, the system 10 provides a virtual channel buffered switch that avoids the need of credits from front to back within (or end to end of) the buffer switch, by internally separating paths from input to output per virtual channel. In this way, due to the separation, no internal path can be blocked by other virtual channels. For this reason, the bandwidth is fully utilized within the switch. Furthermore, this results in a simpler switching scheme, a simpler buffer logic, and far better timing paths. This also results in fewer bugs, less susceptibility to bugs, and dramatically less potential for deadlock scenarios.

In the arrangement shown, as one example, system 10 includes a virtual channel switch 30. Virtual channel switch 30 refers generally herein to the virtual channel switches that make up a larger virtual switch. The virtual channels switches 30, in the arrangement shown, are formed to allow for the direction of data packet travel down the path of a virtual channel.

In the arrangement shown, as one example, the virtual channel switch, when expanded, is formed of a set of virtual channel switches 30. These virtual channel switches 30, or set of virtual channel switches 30, each include an arbitration functionality where the first level of arbitration are switches which are located within the virtual channel 32, or within virtual channel switches 32, as well as a second level of arbitration switches which are located between virtual channels, or between virtual channel switches 34. These formations of within virtual channel switches 32 and between virtual channel switches 34 is just one arrangement, as shown herein. Other levels of virtual channel switches 30 are also contemplated for use which might be variations on first level, second level, third level, or subsequent levels, as well as having buffers and the like (buffers to be further discussed herein).

In the arrangement shown, as one example, system 10 includes an optional buffer 40. Optional buffer 40 (or simply "buffer") is formed of any suitable size, shape, and design and is formed to provide for optional buffering overflow at each level of the virtual switch 30. In this way, an optional buffer 40 may be implemented in various ways. For example, an optional buffer 40, and/or set of optional buffers 40 can be implemented at a level of switching.

In the arrangement shown, as one example, buffers 40 can be implemented per virtual channel, per layer. In this way, single packet, double packet, or triple packet buffers can be implemented in a flexible and desirable way per each virtual channel. In other words, zero optional buffers may exist on a virtual channel at the virtual channel mapping switch level, or a buffer for every virtual channel may exist at the virtual channel mapping switch level. Similarly, any number of buffers may be implemented which synchronizes with the number of virtual channels available at this level.

Similarly, zero optional buffers may exist on a virtual channel at the within virtual channel switch level, or a buffer for every virtual channel may exist at the within virtual channel switch level. Similarly, any number of buffers may be implemented which synchronizes with the number of virtual channels available at this level.

Similarly, zero optional buffers may exist on a virtual channel at the between virtual channel switch level, or a buffer for every virtual channel may exist at the between virtual channel switch level. Similarly, any number of buffers may be implemented which synchronizes with the number of virtual channels available at this level. These and other buffer implementations are hereby contemplated for use. For example, various buffer types may exist at each location which handle single packet buffering, double packet buffering, triple packet buffering, or more.

As one example, a system and method are presented in this disclosure for the purpose of providing data loss prevention and latency prevention with respect to buffered switch. Furthermore, the systems and methods presented in this disclosure help with the prevention of bandwidth failure and many other advantages. In the arrangement shown, as one example, the various aspects and embodiments of the invention provides a method of use for end to end data transmission and buffered switch.

In accordance with various embodiments and aspects of the invention and as one example, shown in FIG. 1 through FIG. 16 and particularly pointed out in FIG. 7 (as one example), and in the disclosure, a method of architecturing, building, and implementing buffered switch system 10 is provided. This system and method of implementation is generally for the transmission of data packets through a buffer switch. During typical data transmission, data and/or data packets are sent through a wire and arrive as transactions at virtual channel arbitrator which sends the arriving transactions in the greater buffer switch. This wire is configured to carry a certain amount of data and/or data packets. At varying times, different amounts of data and/or data packets are transmitted. Furthermore, varying times may see spikes to a particular address or from a particular point. Furthermore, other variances and/or variables can contribute to data transmission. Typically, a wire or the like will have what is referred to as a bandwidth. This is the amount of data or data packets that can be transmitted at a given time across a single source.

As data packets enter the buffer switch, they are sorted into various virtual channels, if the data being transmitted exceeds the bandwidth at a given time, then the data is lost. These data or data packets are lost, or more commonly referred to as "dropped". To prevent this type of data loss in the present method of use, a buffering system is utilized, the buffering system or buffering switch, generally speaking, having a plurality of virtual channels and being formed of a plurality of virtual switches within.

For ease of explanation, a mirror of common buffering methods can be explained, which are a type of holding place so that data goes to buffering and is potentially delayed rather than lost. The more and more complex and the more and more data systems become, larger data transactions and the like, the more latency that will occur with the added complexity of buffering systems. For this reason, and for simplicity as a comparison, the present, general, method of use does not have latency and prevents data loss through the novel creation of an internally separated channel for data travel. In other words, after the data is transmitted from the wire to the buffer switch, and subsequently enters a virtual channel, the data will be on a dedicated virtual channel within the buffer switch. This dedicated channel within the buffer switch is internally separated from the other virtual channels.

Furthermore, this method of use, via the dedicated internally separated virtual channel does not require credits (which add to the latency and cumbersomeness of a system) and other latency building features of other buffering methods. Furthermore, the present method of use requires a much smaller system with fewer wires, as compared to the more cumbersome existing systems and methods of use.

Said another way, in the general method of use, as one example, first, arriving transactions to the system are sorted onto any one of a plurality of virtual channels. The data and/or data packet then travels along a dedicated, internally separate virtual channel. These data and/or data packets may travel through various virtual switches and eventually emerge as output. In this way, and as is shown in one example, the end switch will know if a particular virtual channel is being used because the circuit and/or dedicated channel is internally separate. In other words, the end switch will know what is happening at the input of any given channel and credits are not necessary.

In accordance with various aspects and embodiments of the invention, and as is shown in FIG. 1 through FIG. 16, and particularly in FIG. 9 through FIG. 14, a method of buffering switching is presented, which integrates virtual channel mapping switches.

In the general method of use, as outlined herein, first, arriving transactions to the system are sorted onto any one of a plurality of virtual channels. The data and/or data packet then travels along a dedicated, internally separate virtual channel. These data and/or data packets may travel through various virtual switches and eventually emerge as output. In this way, and as is shown in one example, the end switch will know if a particular virtual channel is being used because the circuit and/or dedicated channel is internally separate. In other words, the end switch will know what is happening at the input of any given channel and credits are not necessary.

However, there may be circumstances and/or applications in which a dedicated circuit is not limited to one path. For this reason, and as is shown in the example (particularly pointed out in one example in FIG. 9) the ability to "jump" and/or "hop" from one dedicated virtual channel to another dedicated virtual channel may be desired. In this method of use, a data and/or data packet travels through the buffering switch from end to end in the same way except that virtual channel mapping switches are integrated in-line in order to be able to switch which dedicated virtual channel the data is traveling along.

Said another way, this method of use, virtual channel mapping, is a variation on the general method of use which provides a layer of virtual channel hopping or virtual channel mapping, which is useful in looped topologies and/or for general traffic management scenarios.

As another example, and as is shown in FIG. 1 through FIG. 16, and more particularly in FIG. 11 through FIG. 16, variations of method of use for additional buffering are provided in accordance with various aspects and embodiments of the invention. In addition to the general use method disclosed herein, the virtual channel mapping method disclosed herein, and other methods disclosed herein, optional buffers may be implemented inline at one or more of the various levels of switching within the buffer switch. Buffering at various levels, such as adding an in line buffer to the virtual channel after the virtual channel switch has proven to dramatically increase the throughput of a mesh topology. For this reason, and others, methods of use for adding buffers (of varying sizes), at various levels, are hereby contemplated for use.

While the figures shown herein show optional buffers after the within virtual channel switches and the between virtual channel switches, other configures and architecture are hereby contemplated for use. These and other methods of use and processes are hereby contemplated for use.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including," "includes," "having," "has," "with," or variants thereof are used in either the detailed description and the claims, such terms are intended to be inclusive in a similar manner to the term "comprising."

It will be appreciated by those skilled in the art that other various modifications could be made to the device without parting from the spirit and scope of this disclosure (especially various programmable features and architecture). All such modifications and changes fall within the scope of the claims and are intended to be covered thereby. The scope of the invention, therefore, is not intended to be limited to the exemplary embodiments and aspects that are shown and described herein. Rather, the scope and spirit of the invention is embodied by the appended claims.

What is claimed is:

1. A buffered switch circuit in the network-on-chip (NoC) for data transmission, the buffered switch comprising:
   an input for receiving a plurality of transactions in the form of data packets;
   a plurality of internal channels, which utilize the buffered switch's bandwidth and are communicatively coupled to the input, wherein each of the plurality of internal channels has a plurality of routes and each of the plurality of routes are internally separate from one another thereby eliminating the need for credits;
   at least one buffer communicatively coupled to the plurality of internal channels, wherein the buffer is capable of storing at least one data packet of the data packets;
   a plurality of switches communicatively coupled to the plurality of internal channels, wherein an end switch of the plurality of switches of a given internal channel is aware of data packets traveling along the given internal channel as the given internal channel's respective plurality of routes are internally separated;
   a plurality of interfaces communicatively coupled to the plurality of switches; and
   an output communicatively coupled to the plurality of interfaces such that each of the plurality of internal channels' route is separate through the buffered switch and merged at the output.

2. The buffered switch within a system of claim 1, wherein one of the switches includes at least one switch buffer.

3. The buffered switch within a system of claim 1, wherein each of the plurality of routes is a dedicated route through the buffered switch.

4. The buffered switch within a system of claim 1, wherein the plurality of routes form a plurality of parallel routes.

5. The buffered switch within a system of claim 1, wherein each of the plurality of interfaces is a single interface.

6. The buffered switch within a system of claim 1, wherein the interface is a multiple interface.

7. A buffered switch circuit in the network-on-chip (NoC), the buffered switch having a bandwidth, the buffered switch comprising:
   an input for receiving a plurality of data packets;
   a plurality of internal paths, each of which utilizing separate bandwidths within the bandwidth and are in communication with the input, wherein each of the plurality of internal paths include a plurality of routes that are each internally separate from one another thereby eliminating the need for credits;
   a plurality of switches communicatively coupled to the plurality of internal paths, wherein an end switch of the plurality of switches of a given internal path is aware of data packets traveling along the given internal path as the given internal path's respective plurality of routes are internally separated;
   at least one internal buffer in communication with the plurality of internal paths, wherein the buffer stores at least one data packet of the plurality of data packets; and
   an output in communication with the plurality of internal paths, wherein each of the plurality of routes are merged at the output.

* * * * *